Aug. 18, 1953  T. G. REYNOLDS  2,649,404
METHOD OF COKE-OVEN BY-PRODUCT RECOVERY
Filed Sept. 26, 1950
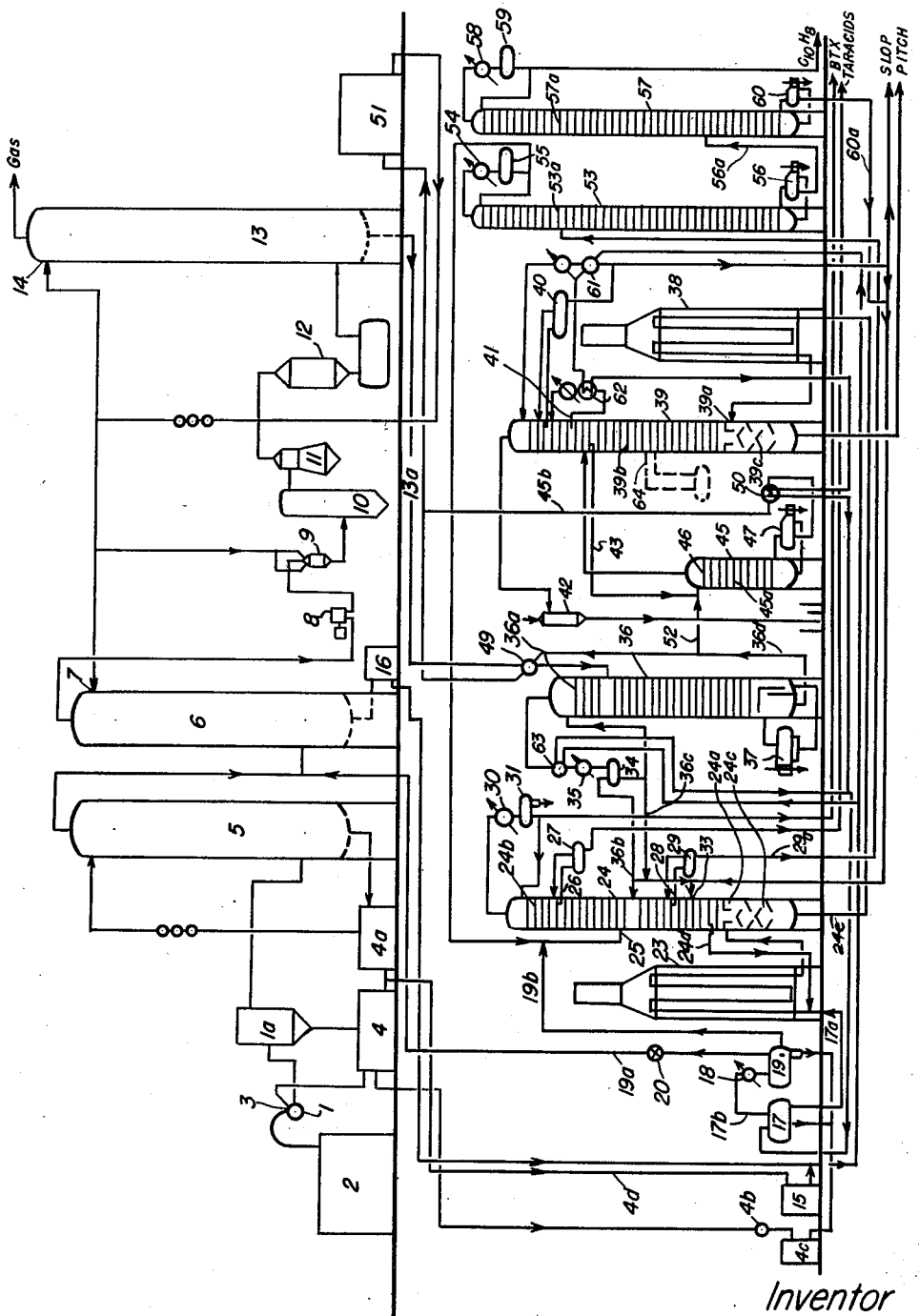
Inventor
Thomas G. Reynolds
By his attorneys
Howson and Howson Patented Aug. 18, 1953

2,649,404

UNITED STATES PATENT OFFICE 2,649,404

METHOD OF COKE-OVEN BY-PRODUCT RECOVERY

Thomas G. Reynolds, Media, Pa., assignor to United Engineers & Constructors Inc., Philadelphia, Pa., a corporation of Delaware Application September 26, 1950, Serial No. 186,886

12 Claims. (Cl. 196—8)

This invention pertains to an improved method and apparatus for the recovery of by-products from hot coke-oven gases.

When natural carbonaceous materials such as coal, lignite, peat or the like are heated in the absence of air, certain gaseous materials containing tars, ammonia, various aromatic compounds such as benzene, naphthalene, anthracene and the like with hydroxy derivatives thereof and lighter substances including oxides of carbon, hydrogen, water and the lower paraffins and olefins are driven off. It is economically desirable to to recover most of these substances and especially to recover the maximum possible yield of the valuable aromatic compounds.

Processes and apparatus for the recovery of by-products from hot coke oven gases have long been known. Modern practice in general requires that the gases coming from the coke ovens be treated first with an aqueous flushing solution whereby the tars and a certain amount of the ammonia are removed. Next, according to the general practice, the gases are reheated, compressed to overcome the frictional resistance of the apparatus and treated with sulphuric acid to remove the balance of the ammonia. Then the gases are usually passed through a final cooler where they are contacted with water with resultant lowering of their temperature and consequent precipitation of naphthalene. Finally, the gases are usually scrubbed with an absorber oil to remove the light oils.

Known processes such as described above are open to various objections. In the first place, the tars are separated and treated in one place, naphthalene in another place and light oil in still a third place resulting in duplication of equipment. Again, the separation of naphthalene in the final coolers is not entirely complete and much of this material will pass out into the gas mains with resultant clogging and obstruction of such mains. Moreover, in many cases an absorber oil must be purchased separately at additional expense for use in the light oil scrubbers.

In the co-pending application of G. L. Eaton, Serial No. 161,325, filed May 11, 1950, a process and apparatus for the recovery of coke oven by-products is described and claimed wherein a naphthalene scrubber is inserted before the exhauster or compressor and prior to the ammonia saturators. The naphthalene scrubber may be operated on a creosote absorber oil produced in the process itself, although as disclosed in that application, other absorber oils may be used. According to the invention described in said pending application, the naphthalene rich absorber oil from this scrubber is combined with a heavy carrier, such as the tar previously removed from the hot gases in conventional manner, and the combination subjected to a distillation procedure for the production of naphthalene, light oils, pitch and the recovery of the absorber oil. The absorber oil so recovered may be recycled and used again both in the naphthalene and light oil scrubbers.

By this expedient a more efficient recovery of naphthalene and light oils is obtained and many disadvantages of previous processes are overcome.

In application Serial No. 161,325 there are disclosed two methods whereby the mixture of heavy carrier and naphthalene rich absorber oil can be distilled for separation into its several components. These methods are generally satisfactory, but it is an object of the present invention to provide a still more economical and efficient method and apparatus for the fractionation of a mixture of heavy carrier and light oil rich absorber oil. In particular it is an object of the present invention to provide a method and apparatus for the separation of a mixture of heavy carrier and naphthalene rich absorber oil in which the polymerization of resinous compounds is reduced and in which corrosion of equipment due to the decomposition of ammonium chloride which may be present in the mixture is avoided.

It is a further object of the invention to provide a process and apparatus wherein a better fractionation of a mixture of heavy carrier and creosote absorber oil can be obtained than has hitherto been possible.

It is another object of the present invention to provide a process for fractionating a mixture of heavy carrier and naphthalene rich absorber oil at a relatively low temperature.

It is still another object of the present invention to provide a method and apparatus for producing an improved creosote absorber oil.

It is another object of the present invention to provide a more economical naphthalene fractionation than has hitherto been possible.

It is a further object of the invention to provide for a method and apparatus for separating a combined stream of heavy carrier and naphthalene rich absorber oil into its various components with minimum cost of piping and equipment.

Other objects will appear from consideration of the following specification and claims.

These and other objects are achieved by fractionating the mixture of heavy carrier and naphthalene rich absorber oil in two stages, the mixture being delivered to a primary fractionator from which naphthalene and substances having lower boiling points than naphthalene are removed as overhead and side streams, and from which the higher boiling constituents are removed as a bottoms stream. According to the invention, the bottoms stream from the first fractionator is then distilled under vacuum with the production of an absorber oil side stream and a pitch bottoms stream. Preferably the absorber oil side stream is further purified in a vacuum stripper. To improve the initial fractionation of the mixture of naphthalene rich absorber oil and heavy carrier, to reduce the vaporization temperature of the mixture and to conserve heat, in the novel process a light carrier, preferably obtained from the process itself, is added to the mixture prior to its fractionation.

In the preferred embodiment of the invention the light oil rich absorber oil from the light oil scrubber is separately distilled and a portion of this distillate is added to the mixture of heavy carrier and naphthalene rich absorber oil undergoing distillation.

By the term "absorber oil," is meant an oil having an initial point (atmospheric distillation) above about 225° C. and an end point not higher than about 400° C., which will take up naphthalene from the coke-oven gases.

Preferably, the absorber oil will have an initial point of about 230° C. and an end point of about 300° C. Such absorber oils may, for example, be of petroleum origin or may be creosote oils obtained from distillation of the coal tar itself.

By the term "light carrier" is meant a substance used to obtain vaporization of a given liquid or of certain portions of a given liquid at lower temperatures than would otherwise be possible. Generally speaking, a light carrier must be miscible in the substance to be vaporized and it must, of course, be chemically inert thereto.

In the process according to the present invention, a light carrier is added to the mixture of heavy carrier and naphthalene rich absorber oil to lower the boiling point of the mixture. Preferably in the present invention the light carrier is a portion of the absorber oil referred to previously. Other substances may, however, be used, such for example as low boiling streams from other stages in the process, or foreign materials such as petroleum oils of suitable boiling point. Preferably, however, where a coal-tar product is used as the heavy carrier or as the absorber oil, an aromatic base oil will be used as the light carrier.

The upper boiling point limit of the light carrier used in the present invention will be the lower boiling point of the mixture classified as pitch and may include anthracene. There is no lower boiling point limit, and the use of even gaseous substances is possible. In practice, however, the boiling point range of the light carrier will be between about 225° C. and about 400° C., preferably between about 230° C. and about 300° C.

By a "heavy carrier" is meant a liquid hydrocarbon carrier having an end point above the end point of the absorber oil and one, at least a portion of which will remain liquid when the absorber oil is vaporized. The carrier may be of petroleum origin or may be a coal tar. Examples of suitable carriers are coke oven by-product tar, and Bunker C fuel oil of petroleum origin.

The proportion of carrier in the distilland should generally be not less than about 2% by weight. One function of the carrier is to insure that no particles of tar or pitch carried into the distillation equipment will remain on any hot surface and there polymerize to coke. The minimum percent specified is considered the least quantity which will perform this function. Where the boiling point range of the carrier is such that a part of it is vaporized with the absorber oil, the total quantity of carrier added must be such that the fraction which will remain liquid upon vaporization of the absorber oil constitutes not less than 2% of the distilland.

There is no upper limit to the quantity of carrier which may be added, but if the carrier is added solely for the purpose of preventing the coking of entrained tar and pitch, in general no more than the amount required for that purpose will be added.

It will be understood that the boiling point of the absorber oil is dependent on the nature of the carrier used and the one must be chosen with due regard to the other. Thus, if by-product tar is used as a carrier the boiling range of the absorber oil must be such that its end point is below about 335° C., in order that the absorber oil may readily be purified of the phenanthrene and anthracene, normally present in coal tars, by distillation.

In the preferred embodiment of the invention, the absorber oil used in both naphthalene and benzol scrubbers is a creosote oil having a boiling point range (atmospheric distillation) of from about 230° C. to about 300° C. In this embodiment, the by-product tar previously removed from the gases is used as a heavy carrier and is combined and distilled along with the naphthalene rich absorber oil from the naphthalene scrubber. Moreover, in the preferred embodiment the light carrier is a fraction consisting essentially of the same creosote absorber oil referred to above.

In the drawings, the figure of the drawing is a flow diagram of a process for the recovery of by-products from hot coke oven gases according to the invention.

Referring to the figure of the drawing, a collecting main 1 is provided for receiving the hot gases from a battery of coke ovens such as 2. An injector 3 is provided for delivering flushing liquor to the collecting main. A primary cooler 5 is connected near its bottom to receive gases from the main 1 through downcomer 1a. Two decanters 4 and 4a are connected to the main 1 and primary cooler 5, respectively, to receive the foul liquor from those sources. A tarry emulsion settles out in the decanters, and the tar free aqueous liquor remaining is used to contact fresh gas in the main and primary cooler. Surplus liquor from decanter 4, which contains a considerable amount of ammonia, is discharged through ammonia liquor collecting tank 4b to storage tank 4c. A naphthalene scrubber 6 is located immediately downstream from the primary cooler 5, having an inlet 7 at its top for the introduction of an absorber oil.

To maintain suction in the upstream and pressure in the downstream line an exhauster 8 is inserted downstream from the naphthalene scrubber. Downstream of the exhauster is an intermediate cooler 9 for cooling the gas. Connected downstream of the intermediate cooler are ammonia saturator 10, acid trap 11 and final cooler 12. After final cooler 12 means are provided for leading the gas to the bottom of a light oil scrubber 13 which, like the naphthalene scrubber 6, is provided with an inlet 14 for absorber oil.

A line 4d is provided for delivering the tar from decanters 4 and 4a to a tar storage tank 15. An intermediate storage tank 16 is provided for receiving the naphthalene rich absorber oil from the bottom of the naphthalene scrubber 6.

Purification of the tar from storage tank 15 to rid it of water and solid impurities may be accomplished in any convenient manner. Preferably a flash and settler drum 17 constructed according to my co-pending application Serial No. 186,887, filed September 26, 1950, is provided for this purpose and is connected with tar storage tank 15 and naphthalene rich absorber oil intermediate storage tank 16. Heat exchangers 61, 62, 63 and 50 are provided to heat under pressure the mixture of tar and naphthalene rich absorber oil entering drum 17.

First separator drum 17 separates it charge into three layers, a tar layer, a water layer and a vapor layer containing ammonia, water and hydrocarbons.

A line 17a is provided through which the pure tar layer can be removed from drum 17. The line 17a passes through a fired pipe still heater 23 and discharges into a first fractionator 24.

A line 17b connects that portion of drum 17 containing vapor through a condenser 18 to a second separator drum 19, where ammonia water separates in a lowest phase, hydrocarbons in an intermediate layer and ammonia and light hydrocarbons in a vapor phase. A line 19a is provided for removing the upper vapor phase from separator drum 19 through a pressure controller 20 to the upstream side of naphthalene scrubber 6. A line 19b is provided for charging the hydrocarbon layer from separator drum 19 to fractionator 24 at point 25.

The first fractionator 24 has a flash zone 24a, a plurality of bubble trays 24b above the flash zone and about four or five disc and doughnut baffles 24c below the flash zone. About 5 trays below the top of the first fractionator a tar acid drawoff 26 is installed which leads to a tar acid charge accumulator 27. A drawoff 28 for naphthalene is located about 7 trays above the flash zone. The side stream is gathered in a naphthalene charge accumulator 29. Also provided are reflux means, including a condenser 30 and a reflux accumulator 31 for maintaining the quality of the overhead from the fractionator. Several trays above the fractionator flash zone a line 24d is provided through which liquid may be withdrawn and charged with the combined feed stream to the furnace 23.

Turning to light oil scrubber 13, a line 13a is provided for conveying its bottoms stream to a light oil fractionator-stripper 36 for the separation of light oils from their adsorber oil. Preferably, fractionator-stripper 36 is constructed to operate without the use of internal stripping steam and has a number of bubble trays 36a, a reboiler 37 and a condenser 35 and accumulator 34 for its overhead.

Light oil fractionator-stripper 36 is connected to fractionator 24 by lines 36b and 36c. Line 36b is adapted to charge a mixture of light oil vapor and liquid to fractionator 24 at a point from about 4 to about 10 trays from the flash zone. Line 36c is adapted to charge light oil liquid to the fractionator 24 at another point from about 4 to about 10 trays above the flash zone. A line 24e is provided for conveying the bottoms from the first fractionator 24 through a heater 38 to the flash zone 39a of a second fractionator 39. The second fractionator 39 operates under vacuum. It has bubble trays 39b and disc and doughnut baffles 39c and is provided with reflux means comprising an accumulator 40 for controlling losses of product overhead and maintaining quality of products. Circulating reflux drawoff 41 is provided for refluxing the fractionator and thus maintaining quality of product. A barometric condenser 42 is provided for condensing any vapor overhead, providing vacuum and removing any uncondensable vapor.

A drawoff line 43 on fractionator 39 is provided for charging a creosote oil stream to a vacuum stripper 45 at the first tray 46 of a plurality of bubble trays 45a. A reboiler 47 is provided at the base of the vacuum stripper 45.

Lines 36d and 45b are provided for conveying the bottoms from the light oil fractionator-stripper 36 and the vacuum stripper 45 through heat exchangers 49 and 50 to storage tank 51 for use as absorbing liquid for the naphthalene scrubber 6 and light oil scrubber 13. A drawoff 52 diverts a portion of the bottoms from light oil fractionator stripper 36 and charges it to the top tray 46 of the vacuum stripper 45 as a combined feed with the drawoff from fractionator 39.

A line 29a is arranged for charging the crude naphthalene withdrawn from accumulator 29 to a primary naphthalene fractionator 53. Fractionator 53 has a plurality of bubble trays 53a, a reboiler 56, and is provided with a reflux means, including a condenser 54 and an accumulator 55 for maintaining control of products passing overhead. This impure product is recycled to enter the first fractionator 24 at a point 25. A line 56a is provided for charging the bottoms from primary naphthalene fractionator 53 to a secondary naphthalene fractionator 57. Fractionator 57 has a plurality of fractionating trays 57a, a reboiler 60, and is provided with a reflux means including a condenser 58 and accumulator 59 for maintaining a purity of overhead naphthalene product. A line 60a is provided whereby the impure product bottoms of secondary naphthalene fractionator 57 may be recycled to primary fractionator 24, entering at point 33.

In the operation of the plant shown in the flow sheet of the drawing, the hot gases coming from the coke-oven 2 are contacted in the collecting main 1 with an aqueous flushing solution injected through nozzle 3. By this means they are cooled, a certain quantity of the tar is precipitated and some of the ammonia is absorbed. The foul liquor collecting in the main is run off to decanter 4 where it separates into a tar layer and an ammonia water layer. The gases emerging from the main 1 pass up through primary cooler 5 where they are contacted with more aqueous flushing liquor. By this means they are further cooled and additional tar and ammonia are removed. The foul liquor from the primary cooler 5 is run to decanter 4a where it too separates into a tar and an aqueous layer. The water layer from the decanter 4 is used as flushing liquor in the main while the water layer from decanter 4a is similarly used in the primary cooler.

Emerging from the primary cooler the gases are passed through the naphthalene scrubber 6 where they are contacted with a creosote absorber oil for the removal of naphthalene. At this point the gases are at a temperature of about 25° C. to about 30° C. By using from about six to about seven gallons of creosote absorber oil per 10,000 standard cubic feet of coke oven gas, depending on the concentration of naphthalene in the entering gas at this temperature, substantially all of the naphthalene and whatever tar remains in the gases can be removed with little removal of light oils. The naphthalene-free gases emerging from the naphthalene scrubber 6 are passed through exhauster 8 where their pressure is raised to provide suction for the upstream part of the system and pressure for forcing the gases through the downstream equipment. From the exhauster, the gases are further cooled in intermediate cooler 9. They then pass to ammonia saturator 10 where the ammonia not previously absorbed in the main or primary cooler is absorbed with sulphuric acid. Any acid which the gases may have picked up is removed in acid trap 11 and from here the gases pass through the final cooler 12. The gases are then sent through the light oil scrubber 13 where they are again contacted with a creosote absorber oil and their light oil content taken up. From the light oil scrubber the gases may be passed to storage, used directly, or further purified by the removal of ethylene or hydrogen sulphide.

The tar settling out in decanters 4 and 4a is joined with the naphthalene rich absorber oil from naphthalene scrubber 6, heated by heat exchangers 50, 61, 62 and 63 and purified in first separator drum 17 and second separator drum 19. In the purification procedure, the raw tar is subjected to heat and pressure in drum 17 to give an ammonia-water layer, a tar layer and a vapor phase containing ammonia, light hydrocarbons and water vapor. The tar is delivered through line 17a to heater 23. The water is run off to ammonia-water storage. The vapor is condensed in condenser 18 and run into separator drum 19. Here again three phases are formed. The lowest comprises ammonia water and is sent to ammonia storage tank 4c. The intermediate phase is a liquid consisting of low boiling point hydrocarbons and is sent to fractionator 24, entering at point 25. The upper phase is vapor containing gaseous hydrocarbons and a certain amount of ammonia. It is returned to the raw gas line just upstream of the naphthalene scrubber 6.

After processing in the tar purification apparatus, the combined feed is heated to from about 500° F. to about 525° F. in heater 23 and is then charged to the first fractionator 24 at a pressure of from about atmospheric to about fifteen p. s. i. g.

At a point about 7 trays above the lower furnace feed an impure naphthalene side stream 28 is drawn from the first fractionator and fed to an accumulator 29. Vapor from accumulator 29 is returned to the first fractionator above the seventh tray from the lower furnace feed, and the impure liquid naphthalene is fed to the primary naphthalene fractionator 53 for initial processing.

At a point about 5 trays below the top of the first fractionator 24, a tar acid side stream 26 is drawn off and fed to an accumulator 27. Vapor from accumulator 27 is returned to the first fractionator 24, entering above the fifth tray from the top of the first fractionator.

A liquid side stream is taken from about the second tray above the flash zone of the first fractionator 24 and then recycled to join with the tar and naphthalene rich absorber oil fed to the heater 23. This side stream is an impure creosote oil fraction having an initial point of roughly 230° C. and an end point of roughly 300° C. It serves as light carrier and by its addition to the feed entering the heater, vaporization of the lighter portions of the feed is accomplished at considerably lower temperatures than would otherwise be possible.

The light oil rich absorber oil separated in the light oil scrubber 13 is charged to light oil fractionator-stripper 36 for separation of the light oil from the absorber oil.

Fractionator-stripper 36 is operated without steam, heat being supplied through reboiler 37. By eliminating the steam customarily used in stripping light oil from its absorber oil, the necessity for total condensation and subsequent decantation is eliminated, and the overhead from the stripper may be condensed only to the extent desired or deemed necessary. As shown in the figure, the overhead may be partially condensed and one stream consisting of pure liquid fed to fractionator 24 as through line 36c, while another consisting of mixed vapor and liquid may be introduced through line 36b. Charging the overhead from the light oil stripper to the first fractionator 24 in this manner not only concentrates the light oil recovery in one stream and further purifies it, but assists materially in the fractionation processes occurring in fractionator 24, the light oil acting as a "light carrier" in this regard.

The proportion of liquid charged through line 36b will depend on the composition of the crude charge to the first fractionator 24. Thus where the charge contains a high proportion of relatively low boiling components, a larger proportion of stream 36b will be liquid.

That part of the overhead from light oil fractionator-stripper 36 not delivered to fractionator 24 is returned to the top tray of the stripper 36 as reflux.

The bottoms from the stripper consists of lean absorber oil, and after giving up their heat in exchanger 49, may be used again in their entirety in the light oil scrubber 13, or a portion of the bottoms may be sent to the vacuum stripper 45 for further stripping.

As shown in the figure, the controlled vapor portion of the light oils separated in the light oil fractionator-stripper 36 is preferably charged from accumulator 34 to the first fractionator 24 about four trays above the naphthalene side stream drawoff tray. The liquid portion of the light oils separated in the light oil fractionator-stripper 36 is preferably charged to the first fractionator 24 at another point about 4 trays above the flash zone. In any case, the liquid vapor stream will be introduced above the liquid stream and generally above the naphthalene drawoff. The liquid stream will generally be introduced below the naphthalene drawoff.

The overhead from the first fractionator 24 is condensed in condenser 30 and accumulator 31. Part of the condensate is returned as reflux to the first fractionator, while the remainder is discharged for further refining. The bottoms from the first fractionator 24 are withdrawn, heated in heater 38 and charged to the second fractionator 39.

The temperature of the feed entering second fractionator 39 will vary with the products which it is desired to draw off as side streams. Thus, where it is not desired to remove anthracene, the temperature of the charge should be that ncessary to boil up a portion having a boiling point range of from about 200° C. to about 300° C., plus allowance for say 5% over flash.

Where an anthracene side stream is desired, as at 64, the temperature of the charge should be that necessary to boil up a portion having a boiling point range of from about 290° C. to about 400° C. plus a suitable overflash.

A creosote oil side stream is drawn off at a point approximately 9 trays from the top of the second fractionator and charged to vacuum stripper 45. The creosote bottoms from this stripper are prime absorber oil, and after cooling in heat exchanger 50 may be used in naphthalene and light oil scrubbers 6 and 13.

Second fractionator 39 is operated under a vacuum, the absolute pressure being from about 50 millimeters mercury to about 200 millimeters mercury. To obtain this vacuum, a connection is made to the suction side of the barometric condenser 42 or other vacuum producing apparatus, or, alternately, a connection may be made to the suction side of the exhauster 8, preferably on the upstream side of the naphthalene scrubber 6.

A liquid stream is taken from one of the upper trays of second fractionator 39 to accumulator 40, cooled and returned as reflux. The balance of the liquid is recycled either in part or totally to the first fractionator 24 or may be sent to storage. A liquid stream is withdrawn from approximately the sixth tray from the top of fractionator 39, cooled by exchange and returned as intermediate reflux.

The liquid naphthalene stream from accumulator 29 is charged to the primary naphthalene fractionator 53. The impure overhead product is condensed in condenser 54 and collected in accumulator 55. A portion is returned to the primary naphthalene fractionator 53 to control the product leaving overhead and the remainder is recycled to the first fractionator 24. The bottoms from the primary naphthalene fractionator are charged to the secondary naphthalene fractionator. A pure naphthalene product leaving overhead is condensed at a temperature of approximately 200° F. in condenser 58 and collected in accumulator 59. A portion is returned to the secondary naphthalene fractionator 57 as reflux and the remainder transferred as naphthalene product. The bottoms at approximately 480° F. are transferred to the first fractionator 24 for reprocessing.

The apparatus and procedure described provide a more economical and efficient processing for the combined tar and naphthalene rich absorber oil separated from coke-oven gases and also permit the economical recovery of light oil from the rich absorber oil drawn from the light oil scrubbers. Thus, by distilling overhead the naphthalene and lighter constituents in a first fractionator and thus separating them from the heavier material, a lower temperature may be used, a relatively small amount of heat is required, polymerization of the resins in the charge is reduced and decomposition of any ammonium chloride present is avoided. Further, the quantity of absorber oil used in the naphthalene scrubber is continuously purified from sludge by distillation in the course of the process for its fractionation. Moreover, the vacuum used in the second fractionator also reduces the temperature and provides heat and steam economy. In addition, the use of a vacuum stripper provides a highly effective means for the removal of the last vestiges (i. e., 1% or less) of naphthalene from its absorber oil, and permits the production of a highly fractionated absorber oil whose boiling point range may be adjusted to give maximum light oil or naphthalene absorption.

The use of a light-oil fractionator-stripper without steam eliminates the need of condensing the total overhead to remove the steam and allows a heat saving, compensating for the higher reboiler heat input. Further, by controlling the amount of fractionator-stripper overhead which is condensed, and by introducing the liquid portion of this condensate to the first fractionator at the two intermediate reflux feed points in a judicious division, a better control over the naphthalene fractionation in the first fractionator is obtained. Moreover, all of the light oils, i. e., those from the light oil scrubber and the small amount obtained from the tar and from the naphthalene scrubber, are combined in one stream for further processing. In addition, by eliminating steam in the subject process, the first fractionator and fractionator-stripper may be made relatively smaller with a considerable saving in piping costs and general structural expense. The reboil drawoff from the primary fractionator provides a light carrier for the combined furnace feed allowing vaporization at a lower temperature than would otherwise be possible.

In addition, by removing both the lighter impurities as overhead from the primary naphthalene fractionator and the heavy impurities as bottoms from the secondary naphthalene fractionator and charging them to the first fractionator for reprocessing, a naphthalene product of singular purity is obtained as overhead from the secondary naphthalene fractionator.

What is claimed is:

1. A process for the recovery of by-products from hot coke oven gases comprising in combination the steps of contacting said gases with a substantially naphthalene-free absorber oil having an initial point above about 225° C. and an end point not higher than about 400° C. for removal of naphthalene therefrom with consequent enrichment of said absorber oil, and fractionating at least a portion of said napthalene-rich absorber oil in the presence of a heavy carrier having an end point above the end point of the absorber oil at least a portion of which carrier will remain liquid when the absorber oil is vaporized, in two stages, at least a portion of the naphthalene and the constituents boiling below naphthalene in temperature being fractionated from each other, and from constituents boiling above naphthalene taken as a whole, in a first stage and constituents boiling above naphthalene in temperature being fractionated into suitable components in a second stage whereby resin polymerization and corresponding clogging of apparatus is substantially reduced.

2. A process as claimed in claim 1 wherein the second fractionating stage is operated under a vacuum.

3. A process for the recovery of by-products from hot coke oven gases comprising, in combination, the steps of removing tar from said gases, contacting said gases with a substantially naphthalene-free absorber oil having an initial point above about 225° C. and an end point not higher than about 335° C. for the removal of naphthalene therefrom with consequent enrichment of said absorber oil, and fractionating at least a portion of said naphthalene-rich absorber oil in the presence of at least a portion of said tar, in two stages, at least a portion of said naphthalene and the constituents boiling below naphthalene being fractionated from each other, and from constituents boiling above naphthalene taken as a whole, in a first stage and constituents boiling above naphthalene being fractionated into suitable components in a second stage whereby resin polymerization and consequent clogging of apparatus is substantially reduced.

4. A process for the recovery of by-products from hot coke oven gases comprising in combination the steps of removing tar from said gases, contacting said gases with a substantially naphthalene-free absorber oil having an initial point above about 225° C. and an end point not higher than about 335° C. for the removal of naphthalene therefrom with consequent enrichment of said absorber oil, charging at least a portion of said tar and at least a portion of said rich absorber oil to a first fractionator, removing naphthalene and tar acids as side streams from said first fractionator, charging the bottoms from said first fractionator to a second fractionator and drawing off a creosote oil side stream from said second fractionator.

5. A process for the recovery of by-products from hot coke oven gases comprising in combination the steps of removing tar from said gases, contacting said gases with a substantially naphthalene-free absorber oil having an initial point above about 225° C. and an end point not higher than about 335° C. for the removal of naphthalene therefrom with consequent enrichment of said absorber oil, mixing at least a portion of said tar and at least a portion of said rich absorber oil to form a combined stream, heating said combined stream to a charging temperature, charging said heated stream to a first fractionator, removing naphthalene and tar acids as side streams from said first fractionator, removing a side stream from said first fractionator below said naphthalene side stream and joining it to the combined tar and naphthalene rich absorber oil before said combined stream has reached its charging temperature; charging the bottoms from said first fractionator to a second fractionator and removing a creosote oil side stream from said second fractionator.

6. A process for the recovery of by-products from hot coke-oven gases which comprises in combination the steps of removing tar from the gases contacting the gases with a substantially naphthalene and light oil free absorber oil having an initial point above about 225° C. and an end point not higher than about 335° C. for the removal of naphthalene therefrom with consequent enrichment of said absorber oil subsequently contacting said gases with additional substantially naphthalene and light oil free absorber oil for the removal of light oils therefrom and consequent enrichment of said additional absorber oil, charging at least a portion of the tar and at least a portion of the naphthalene rich absorber oil to a first fractionating column, removing naphthalene as a side stream from said first fractionating column, charging material boiling above naphthalene from said first fractionating column to a second fractionating column, charging the light oil rich absorber oil to a fractionator-stripper, removing a water-free light oil vapor overhead stream from said fractionator-stripper partially condensing the light oil stream to form a vapor stream and a liquid stream, charging said vapor stream to a point on said first fractionating column above the naphthalene side stream and charging said liquid stream to a point on said first fractionating column below the naphthalene side stream.

7. A process for the recovery of by-products from hot coke oven gases which comprises in combination the steps of removing tar from said gases, contacting said gases with a substantially naphthalene-free absorber oil having an initial point above about 225° C. and an end point not higher than about 335° C. for the removal of naphthalene therefrom, charging at least a portion of said tar and at least a portion of said naphthalene-rich absorber oil to a first fractionator, removing naphthalene and tar acids as side streams from said first fractionator, charging the bottoms from said first fractionator to a second fractionator, drawing off a creosote oil side stream from said second fractionator and vacuum stripping said creosote oil side stream to provide a continuously revivified creosote absorber oil.

8. A process for the recovery of by-products from hot coke oven gases which comprises in combination the steps of separating tar from said gases, contacting said gases with a substantially naphthalene-free absorber oil having an initial point above about 225° C. and an end point not higher than about 335° C. for the removal of naphthalene therefrom with consequent enrichment of said absorber oil, charging at least a portion of said tar and at least a portion of said rich absorber oil to a first fractionator, charging the bottoms from said first fractionator to a second fractionator, removing tar acids as a side stream from said first fractionator, removing an impure naphthalene side stream from said first fractionator, charging said impure naphthalene stream to a primary naphthalene fractionator, removing the bottoms from said primary naphthalene fractionator and charging them to a second naphthalene fractionator, removing a refined naphthalene stream as overhead from said second naphthalene fractionator and recycling at least a portion of the overhead from said primary naphthalene fractionator to said first fractionator.

9. Process as claimed in claim 8 wherein at least a portion of the bottoms from said second naphthalene fractionator is recycled to said first fractionator.

10. A process for the recovery of by-products from hot coke oven gases comprising in combination the steps of removing tar from said gases, scrubbing said gases with a substantially naphthalene-free absorber oil having an initial point above about 225° C. and an end point not higher than about 335° C. for the removal of naphthalene therefrom, charging at least a portion of said tar and at least a portion of said naphthalene rich absorber oil to a first fractionator, removing naphthalene and tar acids as side streams from said first fractionator, removing constituents having a boiling point above naphthalene as bottoms from said first fractionator and charging them to a second fractionator for fractionation into suitable components whereby materials capable of resinification are largely removed at a comparatively low temperature and clogging of apparatus is thereby avoided.

11. Process as claimed in claim 10 wherein the second fractionator is operated under vacuum.

12. A process for the recovery of by-products from hot coke oven gases comprising in combination the steps of separating tar from the gases, contacting the gases with a substantially naphthalene-free absorber oil having an initial point above about 225° C. and an end point not higher than about 335° C. for the removal of naphthalene therefrom with the consequent enrichment of said absorber oil, mixing at least a portion of said tar and at least a portion of said naphthalene rich absorber oil to form a combined stream, heating said stream to a charging temperature, charging said heated stream to a first fractionator, removing naphthalene and tar acids as side streams from said first fractionator below said naphthalene side stream and joining it to the combined tar and naphthalene rich absorber oil before said combined stream has reached its charging temperature, and charging the bottoms from said first fractionator to a second fractionator for fractionation into suitable components, whereby materials capable of resinification are largely removed at a comparatively low temperature and clogging of apparatus is thereby avoided.

THOMAS G. REYNOLDS.

References Cited in the file of this patent

UNITED STATES PATENTS

| Number | Name | Date |
|---|---|---|
| 1,561,899 | Barbet | Nov. 17, 1925 |
| 1,911,993 | Coubrough | May 30, 1933 |
| 1,932,076 | Kemmer | Oct. 24, 1933 |
| 1,993,344 | Jacobson | Mar. 5, 1935 |
| 2,129,787 | Schmalenbach | Sept. 13, 1938 |
| 2,198,743 | Shuftan | Apr. 30, 1940 |
| 2,299,283 | Schmalenbach | Oct. 20, 1942 |

FOREIGN PATENTS

| Number | Country | Date |
|---|---|---|
| 596,677 | Great Britain | Jan. 8, 1948 |

OTHER REFERENCES

Chas. Cooper, Gas World, vol. 108, Mar. 5, 1938, Coking Section Supplement, pages 27–31 (at foot of page).

Lowry, "Chemistry of Coal Utilization," vol. II, pages 1141, 1146, 1171, 1178–1181, 1191, 1195, 1213, 1214 and 1235 and 1240. Copyright 1945 by John Wiley and Sons, Inc., New York.